US006813151B1

(12) United States Patent
Vane

(10) Patent No.: US 6,813,151 B1
(45) Date of Patent: Nov. 2, 2004

(54) COMPUTER ENCLOSURE AND METHOD FOR MANUFACTURE

(75) Inventor: Cullen P. Vane, Roseville, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 20 days.

(21) Appl. No.: 10/219,654

(22) Filed: Aug. 15, 2002

Related U.S. Application Data

(60) Provisional application No. 60/392,400, filed on Jun. 28, 2002.

(51) Int. Cl.$^7$ ................................................. G06F 1/16
(52) U.S. Cl. ...................................... 361/687; 361/683
(58) Field of Search ............................... 361/683–687, 361/724, 725

(56) References Cited

U.S. PATENT DOCUMENTS 5,329,422 A * 7/1994 Sasaki ......................... 361/686
5,661,635 A * 8/1997 Huffman et al. ............. 361/684
6,532,152 B1 * 3/2003 White et al. ................. 361/692

OTHER PUBLICATIONS

Lajara et al. (US 2002/0041484 A1), "Computer System Housing Configuration", Apr. 11, 2002.*
Web Page http://www.supergraphics.com , "SuperGraphics Outdoor Advertising & Retail Signage," advertisement for SuperGraphics photorealistic, self–adhesive wraps, 1 page, 2002.
Web Page http //www.supergraphics com, "SuperGraphics Leads the Industry in Experience and Capacity," advertisement for SuperGraphics graphics capabilities, 1 page, 2002.
Web Page http //www.supergraphics com, "Bus Graphics—Frequently Asked Questions—SuperGraphics," overview of SuperGraphics bus wrapping capabilities, pp. 1–3, 2002.
Web Page http //www.supergraphics com, "Vehicle Graphic Wraps—Frequently Asked Questions—SuperGraphics," overview of SuperGraphics vehicle wrapping capabilities, pp. 1–3, 2002.
Web Page http //www.supergraphics com, "Train Graphics—Frequently Asked Questions—SuperGraphics," overview of SuperGraphics train wrapping capabilities, pp. 1–3, 2002.
Web Page http://www.supergraphics com, "Wall Sign—Frequently Asked Questions—SuperGraphics," overview of SuperGraphics wall/sign printing capabilties, pp. 1–2, 2002.
Web Page http://www.supergraphics.com, "Gallery of Architectural Signage," advertisement for SuperGraphics sign graphics, 1 page, 2002.
Web Page http://www.supergraphics.com, "Gallery of Architectural Signage," advertisement for SuperGraphics wall murals, 1 page, 2002.

* cited by examiner

Primary Examiner—Yean-Hsi Chang
(74) Attorney, Agent, or Firm—Baker Botts L.L.P.

(57) ABSTRACT

A computer enclosure and method for manufacture include a computer housing and an outer layer, the housing having an inner surface and an outer surface, the outer layer having a first surface and a second surface, wherein the first surface of the outer layer is coupled to the outer surface of the housing and covers a substantial portion of the outer surface, and the second surface of the outer layer has a graphic design applied thereto.

16 Claims, 3 Drawing Sheets

COMPUTER ENCLOSURE AND METHOD FOR MANUFACTURE

RELATED APPLICATIONS

This application claims the benefit of U.S. Provisional Application Ser. No. 60/392,400, filed Jun. 28, 2002, and entitled Computer Enclosure and Method for Manufacture.

TECHNICAL FIELD OF THE INVENTION

This invention relates to computers, and more particularly, to a computer enclosure and method for manufacture.

BACKGROUND OF THE INVENTION

In the competitive field of computers, having a technique to visually distinguish and/or aesthetically enhance a computer provides a substantial competitive advantage. At a simple graphical level, computer manufacturers often use different colors and/or decorative shapes on computer housings in attempting to visually distinguish and/or aesthetically enhance their computers. At a more graphically sophisticated level, manufacturers may use labels or silk-screening to apply images to computer housings.

Unfortunately, there are only a limited number of colors and/or decorative shapes that may be used on computer housings. Additionally, while labels and silk-screening may provide more sophisticated graphics, and thus more options, using even modest sized labels or silk-screening is difficult because of the irregularities of computer housings. Furthermore, if an image is to be placed on more than one face of a computer housing, applying labels or silk-screening is difficult because of the edge between the faces. Moreover, registering silk-screens on computer housings is especially difficult if the image is to be on more than one face of the housing.

SUMMARY OF THE INVENTION

The present invention substantially reduces and/or eliminates at least some of the problems and disadvantages associated with previously developed techniques for providing a distinctive and/or aesthetically enhanced computer housing. Accordingly, the invention provides, at least in certain embodiments, a computer enclosure that has a graphic design on a significant portion thereof.

In particular embodiments, a computer enclosure includes a computer housing and an outer layer. The housing has an inner surface and an outer surface, and the outer layer has a first surface and a second surface, wherein the first surface is coupled to the outer surface of the housing and covers a substantial portion of the outer surface, and the second surface has a graphic design applied thereto.

In some embodiments, a method for manufacturing a computer enclosure includes providing a computer housing having an inner surface and an outer surface. The method also includes coupling the first surface of an outer layer having a first surface and a second surface to the outer surface, the first surface covering a substantial portion of the outer surface of the housing, the second surface having a graphic design applied thereto.

The present invention possesses several technical features. For example, because the graphic design is applied to an outer layer that is coupled to a computer housing, the graphic design may cover a substantial portion of the outer surface of the housing. This allows the graphic design to be readily distinctive and allows for easier registration of the graphic design with the housing. Moreover, more intricate designs and colors may be used, increasing distinctiveness and enhancing aesthetics. As another example, because the graphic design may cover a substantial portion of the housing, the graphic design may appear integral with the housing, which will further provide the graphic design with distinctiveness. As an additional example, because the outer layer may be separated, the graphic design may be readily applied to movable panels of a housing.

Particular embodiments, of course, may possess none, one, some, or all of these technical features and/or additional technical features. Other technical features will be readily apparent to those skilled in the art from the following figures, detailed description, and/or claims.

BRIEF DESCRIPTION OF THE DRAWINGS

The drawings described below provide a more complete understanding of the present invention, especially when considered in conjunction with the following detailed description, and also of its technical features:

FIG. 2 illustrates the computer enclosure of

FIG. 1 at one stage of assembly;

FIG. 3 illustrates the computer enclosure of

FIG. 1 at another stage of assembly;

DETAILED DESCRIPTION OF THE INVENTION

Figure 1:
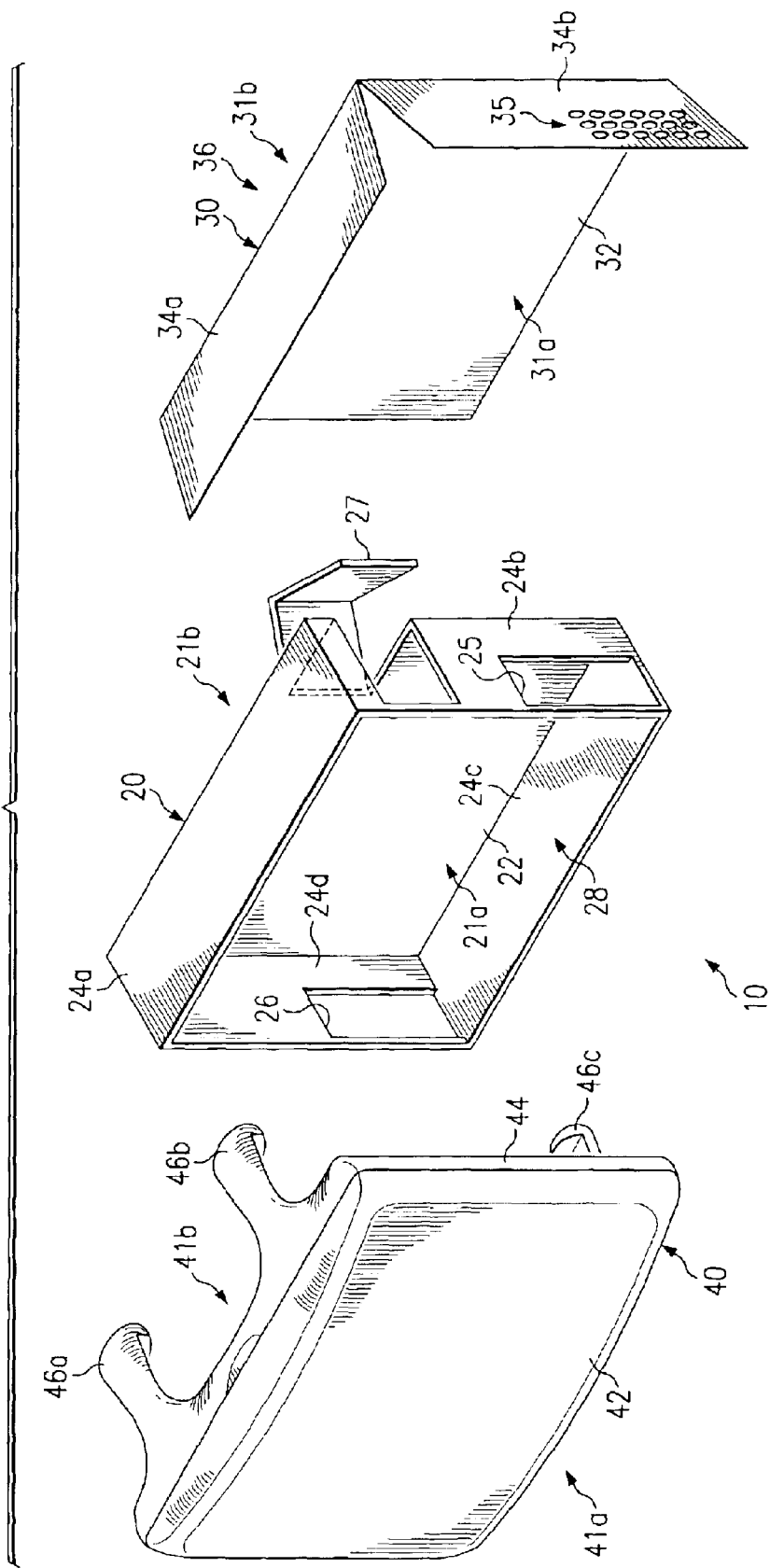
FIG. 1 illustrates a computer enclosure in accordance with one embodiment of the present invention.

FIG. 1 illustrates a computer enclosure 10 in accordance with one embodiment of the present invention. In general, enclosure 10 includes a computer housing 20, an outer layer 30, and a panel 40 and serves to store and protect the components of a computer, which may include any type of devices for storing and/or logically manipulating information.

In more detail, computer housing 20 includes an inner surface 21a and an outer surface 21b. Inner surface 21a and outer surface 21b are formed by a base 22 and walls 24, which extend from base 22. Walls 24 also form an aperture 28. In operation, base 22 and walls 24 assist in storing and protecting the computer components. Base 22 and walls 24 may be composed of metal, plastic, and/or any other appropriate material and may have any appropriate dimension.

Housing 20 also includes an aperture 25 in wall 24b and an aperture 26 in wall 24d. In operation, aperture 25 and aperture 26 allow air to flow into and out of housing 20 to cool the computer components. Aperture 25 and aperture 26 may have any appropriate dimension.

Housing 20 additionally includes a movable panel 27, which is hingedly coupled to base 20 and may be aligned with base 22 and wall 24b. In operation, movable panel 27 may be moved away from inner surface 21a (as shown) to allow access to computer components in housing 20, such as, for example, disk drives, communication ports, and/or any other appropriate components. Movable panel 27 may be of any appropriate dimension and may be hingedly coupled to base 22 in any appropriate manner. Movable panel 27 may be composed of metal, plastic, and/or any other appropriate material.

In other embodiments housing 20 may have a variety of different configurations. For example, although housing 20 is shown as having a rectangular crosssection, housing 20 may have a triangular cross-section, an oval cross-section, a circular cross-section, or any other appropriately shaped cross-section. As another example, aperture 25 and/or aperture 26 may be located in any of base 22 and walls 24 and may have any appropriate shape. Moreover, housing 20 may have additional apertures or fewer apertures, and in particular embodiments, the housing may include a mesh over and/or in the apertures. As a further example, housing 20 may seal the components from the outside environment. As an additional example, wall 24d may have a plurality of communication ports therein. As another example, movable panel 27 may be hingedly coupled to wall 24a, wall 24b, panel 40, and/or a part of panel 40. In general, movable panel 27 may be located in any of base 22 and walls 24 and may have any appropriate shape. Moreover, housing 20 may have any number of movable panels.

Outer layer 30 includes a first surface 31a and a second surface 31b. First surface 31a and second surface 31b are formed by a base 32 and flaps 34, which extend from base 32. In general, base 32 corresponds to base 22 of housing 20, flap 34a corresponds to wall 24a of housing 20, and flap 34b corresponds to wall 24b of housing 20. Furthermore, flap 34b includes a plurality of apertures 35 that correspond to aperture 25 of housing 20. Outer layer 30 may be composed of any appropriate thin, flexible material that may have a graphic design applied thereto. In particular embodiments, outer layer 30 is composed, at least in part, of vinyl.

In this embodiment, second surface 31b of outer layer 30 has a graphic design 36 applied thereto. In general, graphic design 36 may have any shapes, characters, symbols, and/or colors. Graphic design 36 may be applied to second surface 31b by silk-screening, digital imprinting, or any other appropriate process. Note that applying graphic design 36 to base 32, flap 34a, and flap 34b may be difficult because it may be hard to coordinate the design along the seam formed by flap 34a and flap 34b. In particular embodiments, this may be alleviated by making one of base 32, flap 34a, or flap 34b a single color. In general, graphic design 36 may be applied to all or part of flap 34a, flap 34b, and/or base 32.

During assembly, first surface 31a of outer layer 30 is coupled to at least a portion of outer surface 21b of housing 20. For example, the first surface portion of base 32 may be coupled to the outer surface portion of base 22, the first surface portion of flap 34a may be coupled to the outer surface portion of wall 24a, and the first surface portion of flap 34b may be coupled to the outer surface portion of wall 24b. First surface 31a may be coupled to outer surface 21b by being bonded to, adhered to, and/or otherwise coupled to outer surface 21b. As illustrated, outer layer 30 will cover approximately seventy percent of outer surface 21b of housing 20.

In other embodiments, outer layer 30 may have a variety of other configurations. For example, outer layer 30 may not include flap 34a and/or flap 34b. Furthermore, outer layer 30 may include other flaps. As an additional example, outer layer 30 may include fewer and/or additional apertures in flap 34b. Moreover, outer layer 30 may include apertures in flap 34a and/or base 32. As another example, outer layer 30 may have any of a variety of shapes to correspond to outer surface 21b of housing 20. Moreover, outer layer 30 may cover more or less of outer surface 21b. In certain embodiments, outer layer 30 may cover only twenty percent of outer surface 21b. As an additional example, outer layer 30 may include a laminate over graphic design 36. The laminate may serve to protect the design from physical contact and may be composed of any appropriate material.

Panel 40 also includes a first surface 41a and a second surface 41b, first surface 41a forming part of the outer surface of enclosure 10. First surface 41a and second surface 41b are formed by first portion 42 and second portion 44. First portion 42 is hingedly attached to second portion 44 so that first portion 42 may move relative to second portion 44 to allow access to components inside housing 20 when enclosure 10 is assembled. Panel 40 additionally includes couplers 46 (only three of which are shown) to couple panel 40 to housing 20. As illustrated, couplers 46 include arms that extend outward from second surface 41b and prongs at the end of the arms. Panel 40 may be composed of plastic, metal, and/or any other appropriate material.

During assembly, second surface 41b may be moved toward aperture 28 of housing 20. As couplers 46 encounter housing 20, they flex so that they may pass over the outer surface portion of wall 24a and wall 24c. Note that the outer surface portion of wall 24a will have already had flap 34a coupled thereto in this embodiment. As second surface 41b continues to move towards aperture 28, the prongs of couplers 46 extend beyond wall 24a and wall 24c and engage base 32, which covers the outer surface portion of base 22 in this embodiment. Panel 40 may cover aperture 28 at this point, although panel 40 may or may not seal aperture 28.

In other embodiments, panel 40 may have a variety of different configurations. For example, although panel 40 is shown as having a generally rectangular shape, in other embodiments, panel 40 may be triangular, circular, oval, and/or any other appropriate shape for covering an aperture of housing 20. As another example, first portion 42 may not move relative to second portion 44. As an additional example, couplers 46 may be located at any appropriate location on panel 40. As a further example, panel 40 may not include couplers 46. For instance, panel 40 may be coupled to housing 20 by screws, friction fits, and/or any other appropriate type of coupling. In particular embodiments, enclosure 10 may not include panel 40.

Figure 2:
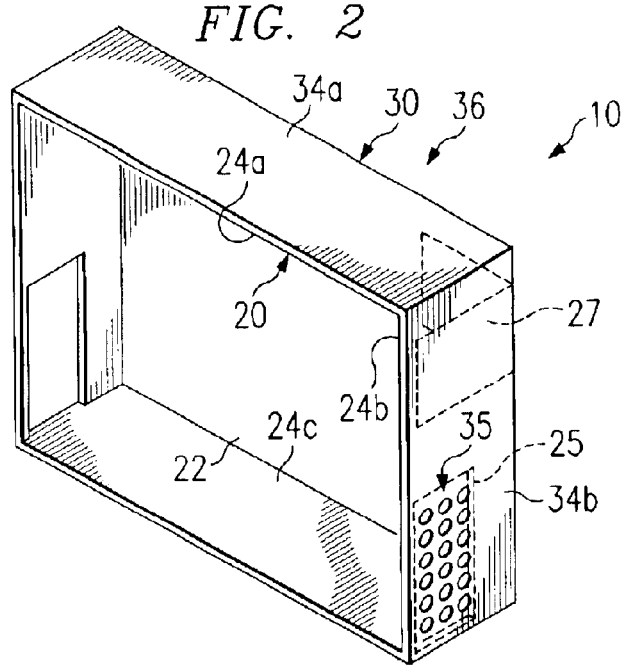

FIG. 2 illustrates computer enclosure 10 at one stage of assembly. At this stage, outer layer 30 has been coupled to housing 20. This may be accomplished, for example, by first coupling the first surface portion of base 32 (not shown) to the outer surface portion of base 22, followed by coupling the first surface portion of flap 34a to the outer surface portion of wall 24a, and then coupling the first surface portion of flap 34b to the outer surface portion of wall 24b.

When assembled, outer layer 30, and consequently graphic design 36, covers approximately seventy percent of the outer surface of housing 20 in the illustrated embodiment. Additionally, apertures 35 in flap 34b align with aperture 25 in wall 24b to allow airflow into and/or out of housing 20. Also, part of flap 34b and base 32 cover movable panel 27 of housing 20.

The portion of outer layer 30 that covers movable panel 27 may be separated, at least in part, from the rest of outer layer 30 to allow movable panel 27 to be moved. Separating this portion of outer layer 30 may be performed by cutting, severing, and/or otherwise disjoining the portion from the rest of outer layer 30. In certain embodiments, outer layer 30 may include a perforation to facilitate the separation.

Figure 3:
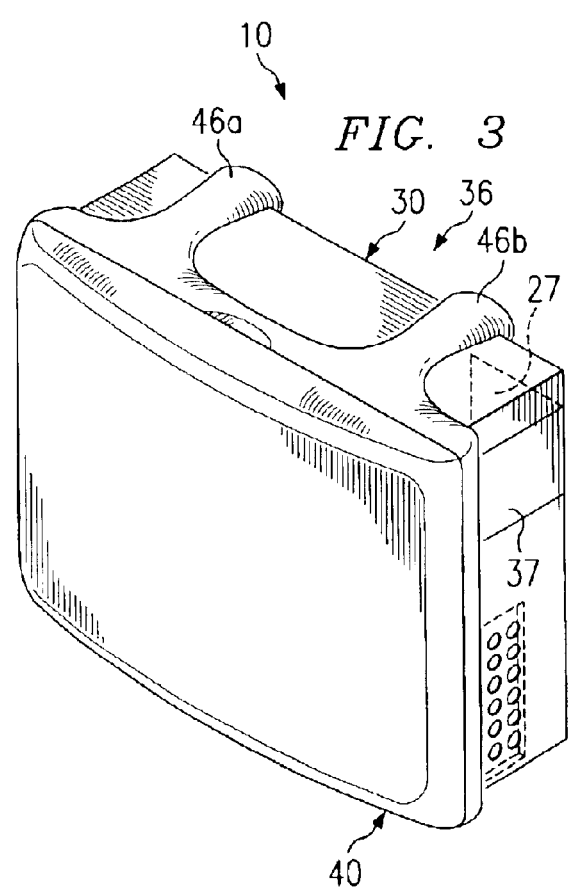

FIG. 3 illustrates computer enclosure 10 at another stage of assembly. At this stage, panel 40 has been coupled to the housing (not shown). As mentioned previously, panel 40 may be coupled to the housing by moving panel 40 toward the housing so that couplers 46 (only two of which are shown) pass over the outer surface of the housing, which has outer layer 30 covering portions thereof, and engage the surface opposite panel 40. In doing so, couplers 46 overlay part of outer layer 30, and hence graphic design 36. Additionally, part of outer layer 30, designated by 37, has been separated from the rest of outer layer 30. As mentioned previously, this allows movable panel 27 of the housing to be moved.

Figure 4:
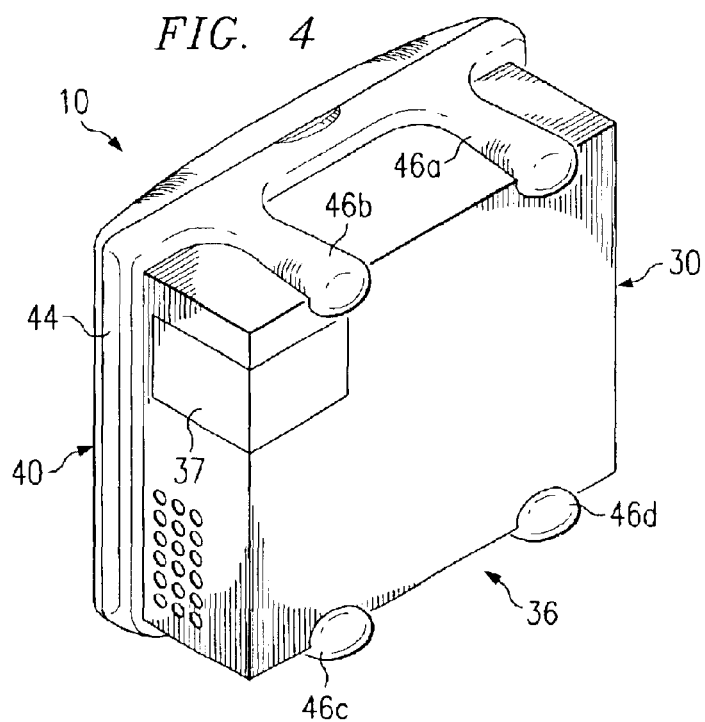
FIG. 4 provides another view of the computer enclosure of FIG. 1 assembled as illustrated in FIG. 3.

FIG. 4 provides another view of computer enclosure 10 assembled as illustrated in FIG. 3. As mentioned previously, outer layer 30, and hence graphic design 36, covers the outside surface of the base of the housing (not shown). Additionally, portion 37 has been separated from outer layer 30 to allow the movable panel (not shown) to operate. Panel 40, in turn, covers an aperture of the housing. Furthermore, second portion 44 of panel 40 extends beyond the housing and along with couplers 46c–d provides a base for enclosure 10. Moreover, each of couplers 46a–d overlays a portion of outer layer 30 on the base of the housing.

As illustrated by FIGS. 1–4, computer enclosure 10 possesses several technical features. For example, because graphic design 36 is applied to outer layer 30 before it is coupled to housing 20, the graphic design may cover a substantial portion of outer surface 21b of the housing. This allows the graphic design to be readily distinctive and allows for easier registration of the graphic design with the housing. Moreover, more intricate designs and colors may be used, increasing distinctiveness and/or aesthetics. As another example, because graphic design 36 may cover a substantial portion of housing 20, the graphic design may appear integral to the housing, which will further provide the graphic design with distinctiveness. As a further example, because outer layer 30 may be separated, the graphic design may be applied to movable panels, such as, for example, movable panel 27. A variety of other examples exist.

Figure 5:
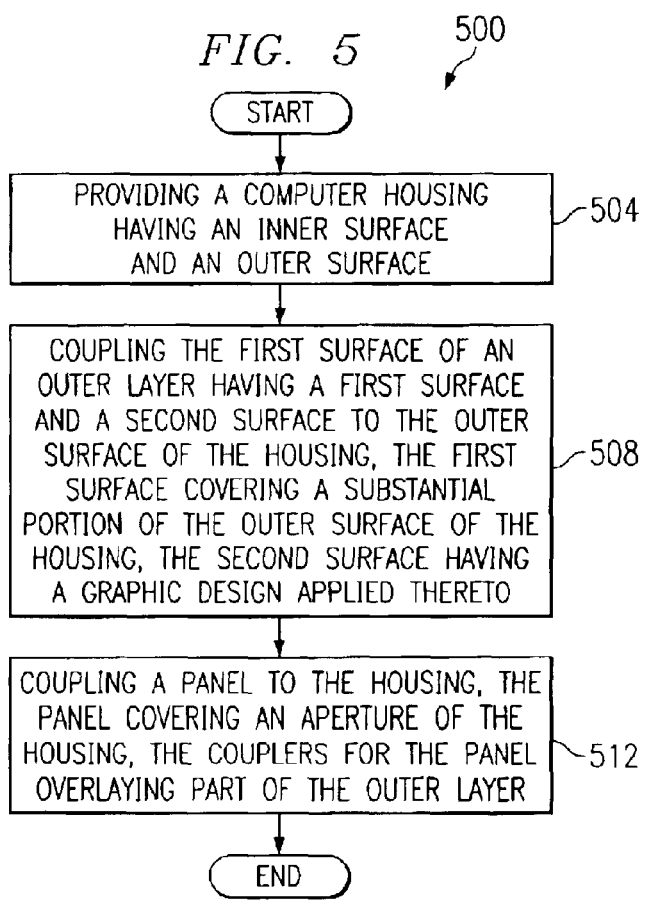
FIG. 5 is a flowchart illustrating a method for manufacturing a computer enclosure in accordance with one embodiment of the present invention.

FIG. 5 is a flowchart 500 illustrating a method for manufacturing a computer enclosure in accordance with one embodiment of the present invention. The method begins at function block 504 with providing a computer housing having an inner surface and an outer surface. The housing, for example, could be similar to housing 20 in FIG. 1. At function block 508, the method continues with coupling the first surface of an outer layer having a first surface and a second surface to the outer surface of the housing, the first surface covering a substantial portion of the outer surface, the second surface having a graphic design applied thereto. For example, as illustrated by enclosure 10, the outer layer may be coupled to multiple faces of the housing and may cover approximately seventy percent of the outer surface of the housing. The second surface may have any appropriate graphic design applied thereto. At function block 512, the method continues with coupling a panel to the housing to cover an aperture of the housing, the couplers for the panel overlaying part of the outer layer. The panel may be similar to panel 40 of enclosure 10, for example, and may be coupled to the housing as illustrated therefore.

Although flowchart 500 illustrates one method of manufacturing a computer enclosure in accordance with the present invention, other embodiments may include fewer, more, and/or a different arrangement of operations. For example, in some embodiments, a panel may not be used, and, thus, function block 512 may not be necessary. As another example, in certain embodiments, a portion of the outer layer may need to be separated therefrom to allow for movement of a movable panel for the enclosure. As an additional example, in particular embodiments, apertures may need to be formed in the outer layer to allow airflow into and/or out of the housing. As a further example, in some embodiments, function block 512 may be performed before function block 508. As an additional example, in certain embodiments the graphic design may be applied to the outer layer after it has been coupled to the housing. A variety of other examples exist.

While a variety of embodiments have been discussed for the present invention, a variety of additions, deletions, modifications, and/or substitutions will be readily suggested to those skilled in the art. It is intended, therefore, that the following claims encompass such additions, deletions, modifications, and/or substitutions to the extent that they do not do violence to the spirit of the claims.

What is claimed is:

1. A computer enclosure, comprising:

a housing, the housing having an inner surface and an outer surface; and an outer layer having a first surface and a second surface, the first surface coupled to the outer surface of the housing and covering a substantial portion of the outer surface, the second surface having a graphic design applied thereto;

a panel coupled to the housing, the panel covering an aperture of the housing, wherein couplers for the panel overlay part of the outer layer.

2. The enclosure of claim 1, wherein:

the outer layer comprises vinyl;

the first surface of the outer layer is adhered to the outer surface of the housing; and the graphic design is applied to a substantial portion of the second surface of the outer layer.

3. The enclosure of claim 1, wherein:

the housing comprises a movable door to allow access to the inside of the housing; and the outer layer is separated around the periphery of the movable door.

4. The enclosure of claim 1, wherein:

the housing contains at least one aperture to allow airflow between the inside and the outside of the housing; and the outer layer contains at least one aperture to allow airflow between the inside and the outside of the housing.

5. The enclosure of claim 4, wherein the outer layer contains a plurality of apertures arranged in a grid to allow airflow between the inside and the outside of the housing.

6. The enclosure of claim 1, wherein a portion of the panel is hinged to allow access to the inside of the housing.

7. The enclosure of claim 1, wherein the outer layer covers at least forty percent of the outer surface of the housing.

8. A method for manufacturing a computer enclosure, comprising:

providing a housing having an inner surface and an outer surface; and coupling the first surface of an outer layer having a first surface and a second surface to the outer surface of the housing, the first surface covering a substantial portion of the outer surface, the second surface having a graphic design applied thereto;

coupling a panel to the housing, the panel covering an aperture of the housing, wherein couplers for the panel overlay part of the outer layer.

9. The method of claim 8, wherein:

the outer layer comprises vinyl;

coupling the first surface to the outer surface comprises adhering the first surface to the outer surface; and the graphic design is applied to a substantial portion of the second surface.

10. The method of claim 8, wherein the housing comprises a movable door to allow access to the inside of the housing.

11. The method of claim 10, further comprising separating the outer layer around the periphery of the movable door.

12. The method of claim 8, wherein:

the housing contains at least one aperture to allow airflow between the inside and the outside of the housing; and the outer layer contains at least one aperture to allow airflow between the inside and the outside of the housing.

13. The method of claim 12, wherein the outer layer contains a plurality of apertures arranged in a grid to allow airflow between the inside and the outside of the housing.

14. The method of claim 8, wherein a portion of the panel is hinged to allow access to the inside of the housing.

15. The method of claim 10, wherein the outer layer covers at least forty percent of the outer surface of the housing.

16. A computer enclosure, comprising:

a computer housing, the housing having an inner surface and an outer surface, the housing comprising:

a movable panel to allow access to the inside of the housing, a first aperture to allow airflow between the inside and the outside of the housing, a second aperture to allow airflow between the inside and the outside of the housing, and a third aperture to allow access to the inside of the housing;

an outer layer having a first surface and a second surface, the first surface adhered to the outer surface of the housing and covering at least seventy percent of the outer surface, the second surface having a graphic design applied thereto, the outer layer comprised of vinyl, separated around the periphery of the movable panel, and containing a plurality of apertures arranged in a grid to allow airflow between the inside and the outside of the housing, the apertures associated with the first aperture of the housing; and a panel to cover the third aperture of the housing, the panel comprising a hinged portion to allow access to the inside of the housing, the panel coupled to the housing by couplers that overlay part of the outer layer.

* * * * *